US011415307B1

(12) United States Patent
Eun et al.

(10) Patent No.: US 11,415,307 B1
(45) Date of Patent: Aug. 16, 2022

(54) LED DRIVER MODULE AND VEHICLE INCLUDING THE SAME

(71) Applicant: HYUNDAI MOBIS CO., LTD., Seoul (KR)

(72) Inventors: Chang Wan Eun, Yongin-si (KR); Kun Ho Lee, Yongin-si (KR); Won Seok Chae, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/539,026

(22) Filed: Nov. 30, 2021

(30) Foreign Application Priority Data

Aug. 10, 2021 (KR) .......................... 10-2021-0105416

(51) Int. Cl.
*F21V 23/00* (2015.01)
*B60Q 1/00* (2006.01)

(52) U.S. Cl.
CPC .......... *F21V 23/009* (2013.01); *B60Q 1/0094* (2013.01)

(58) Field of Classification Search
CPC ..... F21V 23/009; B60Q 1/0094; B60Q 1/263; B60Q 1/2638; B60Q 1/0408; B60Q 1/0416; B60Q 1/0441; B60Q 1/0483
See application file for complete search history.

(56) References Cited

U.S. PATENT DOCUMENTS

| 8,414,166 | B1* | 4/2013 | Charles | B63B 34/10 362/477 |
|---|---|---|---|---|
| 2004/0184281 | A1* | 9/2004 | Duarte | B60Q 1/0094 362/509 |
| 2011/0280035 | A1* | 11/2011 | Minami | F21S 41/17 362/546 |
| 2013/0088886 | A1* | 4/2013 | Eckert | B60Q 1/0425 362/523 |
| 2013/0196525 | A1* | 8/2013 | Takamatsu | H01R 13/627 439/232 |
| 2014/0159482 | A1* | 6/2014 | Satake | H02J 7/14 307/11 |
| 2015/0211721 | A1* | 7/2015 | Mornet | B60Q 1/0094 362/546 |
| 2016/0167604 | A1* | 6/2016 | Aida | B60Q 1/0094 362/546 |

\* cited by examiner

*Primary Examiner* — Bryon T Gyllstrom
*Assistant Examiner* — Christopher E Dunay
(74) *Attorney, Agent, or Firm* — DLA Piper LLP (US)

(57) ABSTRACT

Disclosed are an LED driver module and a vehicle including the same. An LED driver module coupled to a lamp housing of a vehicle includes a connector part coupled to an interior of the lamp housing of the vehicle, a board part, of which a distal end in a first direction contacts the connector part, the first direction being a direction that faces an inside of the lamp housing from an outside thereof, a seating part, on which the board part is seated, and of which a distal end in the first direction contacts the connector part, and a cover part coupled to a side of the seating part in a second direction that is an opposite direction to the first direction, and covering the board part and the seating part from the outside of the lamp housing.

17 Claims, 8 Drawing Sheets

LED DRIVER MODULE AND VEHICLE INCLUDING THE SAME

CROSS-REFERENCE TO RELATED APPLICATION

This application claims the benefit of priority to Korean Patent Application No. 10-2021-0105416, filed in the Korean Intellectual Property Office on Aug. 10, 2021, the entire contents of which are incorporated herein by reference.

TECHNICAL FIELD

The present disclosure relates to an LED driver module and a vehicle including the same.

BACKGROUND

In recent years, LEDs have been commonly used at parts, such as lamps of vehicles, which require light. To operate the LED, an LED driver module that operates an LED has to be essentially mounted on a vehicle.

However, a conventional LED driver module has been mounted on a lamp housing of a vehicle. The conventional LED driver module separately requires an upper case and a lower case for water tightness, ad a case sealing process for coupling the upper case and the lower case is necessary.

In addition, because an inspection process of identifying water tightness of the LED driver module has to be separately added to the conventional LED driver module, processes become complex and process costs increase.

SUMMARY

The present disclosure has been made to solve the above-mentioned problems occurring in the prior art while advantages achieved by the prior art are maintained intact.

An aspect of the present disclosure provides an LED driver module that does not require a separate case for water tightness, and a vehicle including the same.

Another aspect of the present disclosure provides an LED driver module that may simplify processes and reduce process costs, and a vehicle including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an LED driver module coupled to a lamp housing of a vehicle includes a connector part coupled to an interior of the lamp housing of the vehicle, a board part, of which a distal end in a first direction contacts the connector part, the first direction being a direction that faces an inside of the lamp housing from an outside thereof, a seating part, on which the board part is seated, and of which a distal end in the first direction contacts the connector part, and a cover part coupled to a side of the seating part in a second direction that is an opposite direction to the first direction, and covering the board part and the seating part from the outside of the lamp housing.

In another example, the connector part may include a connector body coupled to the vehicle, a plurality of connector grooves recessed from a distal end of the connector body in the second direction, in the first direction, and into which a portion of the board part is inserted, and a division member disposed between the plurality of connector grooves and that divides the plurality of connector grooves, and the board part may include a board member electrically connected to the vehicle, and an insertion groove recessed at a location of a distal end of the board member in the first direction, which corresponds to the division member, in the second direction, and into which the division member is inserted.

In another example, the division member may be biased in a leftward/rightward widthwise direction of the connector groove with respect to a center point of the connector groove in the leftward/rightward widthwise direction thereof.

In another example, the connector part may include a connector body coupled to the vehicle, and an upper guide member disposed on the board part, and coupled to the connector body.

In another example, the upper guide member may include an upper guide surface inclined downwards as it goes in the first direction, and that guides the board part toward a lower side.

In another example, the connector part may further include a lower guide member disposed under the board part, and coupled to the connector body.

In another example, the lower guide member may include a lower guide surface inclined upwards as it goes in the first direction, and that guides the board part toward an upper side.

In another example, the upper guide member and the lower guide member may be disposed in parallel in an upward/downward direction.

In another example, the connector part may include a connector body coupled to the vehicle, and an outer guide member disposed in an outward direction that is a direction that faces an outside of the board part with respect to the board part, and coupled to the connector body.

In another example, the outer guide member may include an outer guide surface inclined in an inward direction that is an opposite direction to the outward direction as it goes in the first direction, and that guides the board part toward the inward direction.

In another example, the seating part may include a seating part body, on which the board part is seated, a first protrusion member protruding upwards from a distal end of the seating part body in the second direction, and a second protrusion member protruding upwards from a distal end of the seating part in a third direction that is perpendicular to the upward/downward direction and the first direction.

In another example, the cover part may include a first cover member inserted into an opening formed in the lamp housing of the vehicle, and to which the seating part is coupled, and a second cover member coupled to a side of the first cover member in the second direction, and having a size that is large enough to cover the first cover member when viewed from the second direction.

In another example, the LED driver module may further include a sealing part surrounding an outer surface of the first cover member, and disposed between the opening and the first cover member.

In another example, the cover part may further include at least one boss member protruding outwards from the second cover member.

In another example, the LED driver module may further include an electric component part coupled to a side of the second cover member in the second direction, and electrically connected to the board part.

In another example, the LED driver module may further include a shielding part disposed on the board part and that shields the board part.

According to an aspect of the present disclosure, a vehicle may include a lamp housing having an opening, and an LED driver module inserted into an interior space of the lamp housing through the opening, and the LED driver module may include a connector part coupled to an inside of the lamp housing, a board part, of which a distal end in a first direction contacts the connector part, the first direction being a direction that faces an inside of the lamp housing from an outside thereof, a seating part, on which the board part is seated, and of which a distal end in the first direction contacts the connector part, and a cover part coupled to a side of the seating part in a second direction that is an opposite direction to the first direction, and covering the opening from an outside of the lamp housing.

BRIEF DESCRIPTION OF THE DRAWINGS

The above and other objects, features and advantages of the present disclosure will be more apparent from the following detailed description taken in conjunction with the accompanying drawings:

FIG. 6 is a view when FIG. 4 is viewed from another direction;

DETAILED DESCRIPTION

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

<Basic Constituent Elements of LED Driver Module>

Figure 1:
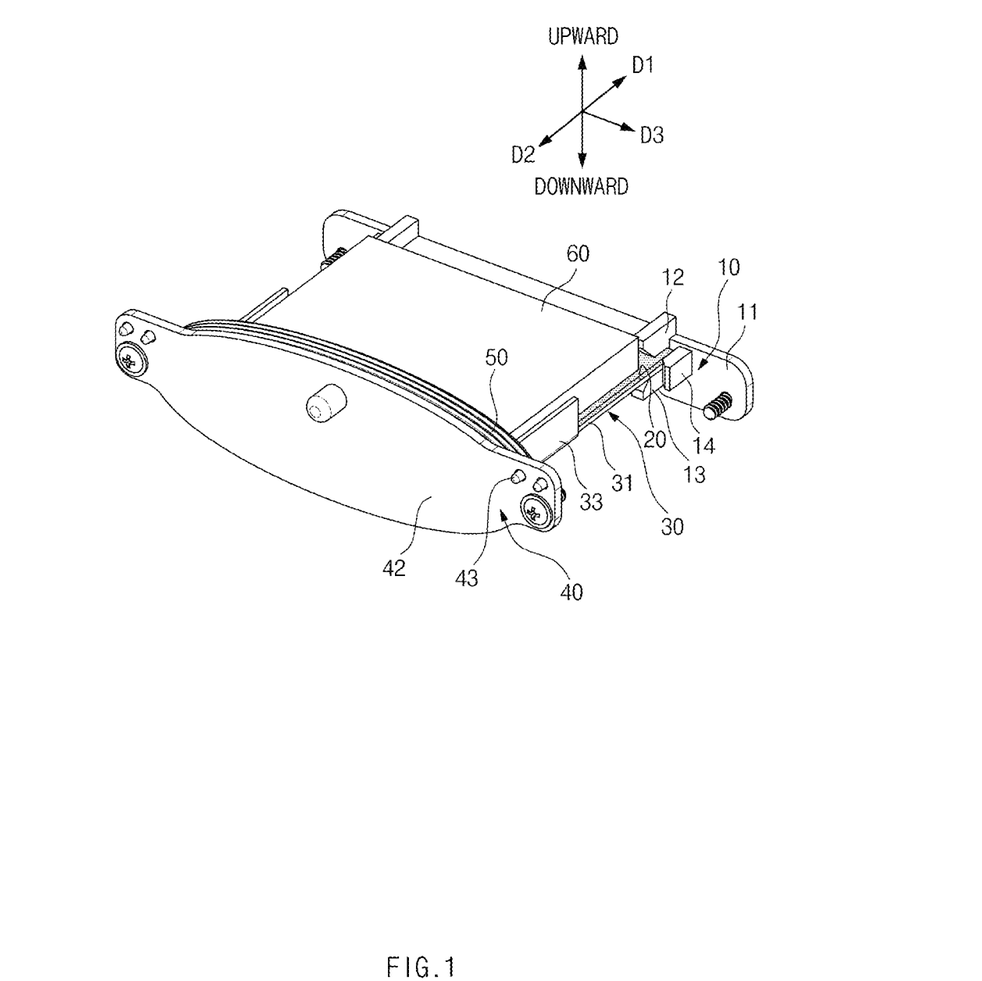
FIG. 1 is a perspective view illustrating an LED driver module according to an embodiment of the present disclosure.
Figure 2:
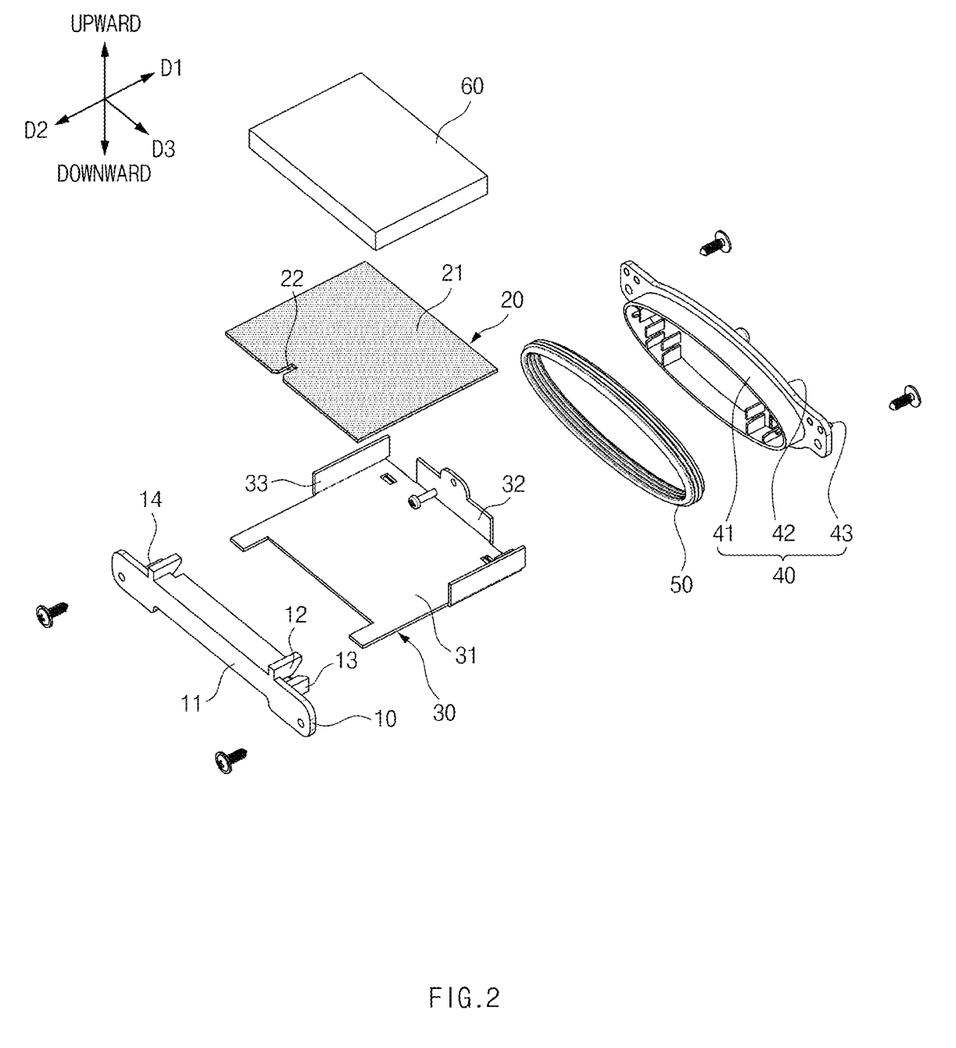
FIG. 2 is an exploded perspective view of FIG. 1.

An LED driver module according to an embodiment of the present disclosure relates to an LED driver module coupled to a lamp housing "H" of a vehicle. FIG. 1 is a perspective view illustrating an LED driver module according to an embodiment of the present disclosure. FIG. 2 is an exploded perspective view of FIG. 1.

As illustrated in FIGS. 1 and 2, the LED driver module according to the embodiment of the present disclosure may include a connector part 10, a board part 20, a seating part 30, and a cover part 40.

For convenience of description, a direction that faces an inside of the lamp housing "H" to an outside thereof is referred to as a first direction D1, and an opposite direction to the first direction D1 is referred to as a second direction D2. The connector part 10 may be coupled to an inside of the lamp housing "H" of the vehicle. FIG. 2 illustrates that the connector part 10 is bolted to the lamp housing "H" of the vehicle, but the present disclosure is not limited thereto and various modifications such as an adhesive or attachment using a magnet may be made.

As the connector part 10 may contact the board part 20 and the seating part 30 as the board part 20 and the seating part 30, which will be described later, are moved in the first direction D1.

A distal end of the board part 20 in the first direction D1 may contact the connector part 10. The board part 20 may be electrically connected to the vehicle. The board part 20 may be disposed in the inside of the lamp housing "H" of the vehicle.

The seating part 30 may be configured such that the board part 20 is seated thereon, and a distal end of the seating part 30 in the first direction D1 may contact the connector part 10. The seating part 30 may be disposed in the inside of the lamp housing "H" of the vehicle. The seating part 30 may be formed of an aluminum material. In more detail, the seating part 30 may be an aluminum plate. However, a material of the seating part 30 is not limited thereto, and may be selected from a range of metals for dissipation of heat.

The cover part 40 may be coupled to a side of the seating part 30 in the second direction D2, and may cover the board part 20 and the seating part 30 from an outside of the lamp housing "H" of the vehicle.

For example, an LED driver module coupled to the outside of the lamp housing "H" of the vehicle may be considered. In this case, an upper case and a lower case for water tightness are separately necessary for the LED driver module and a case sealing process for coupling them and a process of determining a watertight state are necessary, whereby the processes may become complex and process costs may be increased.

According to the LED driver module according to the embodiment of the present disclosure, the LED driver module is disposed in an interior of the lamp housing "H" of the vehicle, and thus a separate case for water tightness may not be necessary.

Furthermore, according to the LED driver module according to the embodiment of the present disclosure, a process of sealing the case and a process of inspecting water tightness are not necessary, whereby the processes become simple and process costs may be reduced.

<Misassembling Preventing Structure>

Figure 3:
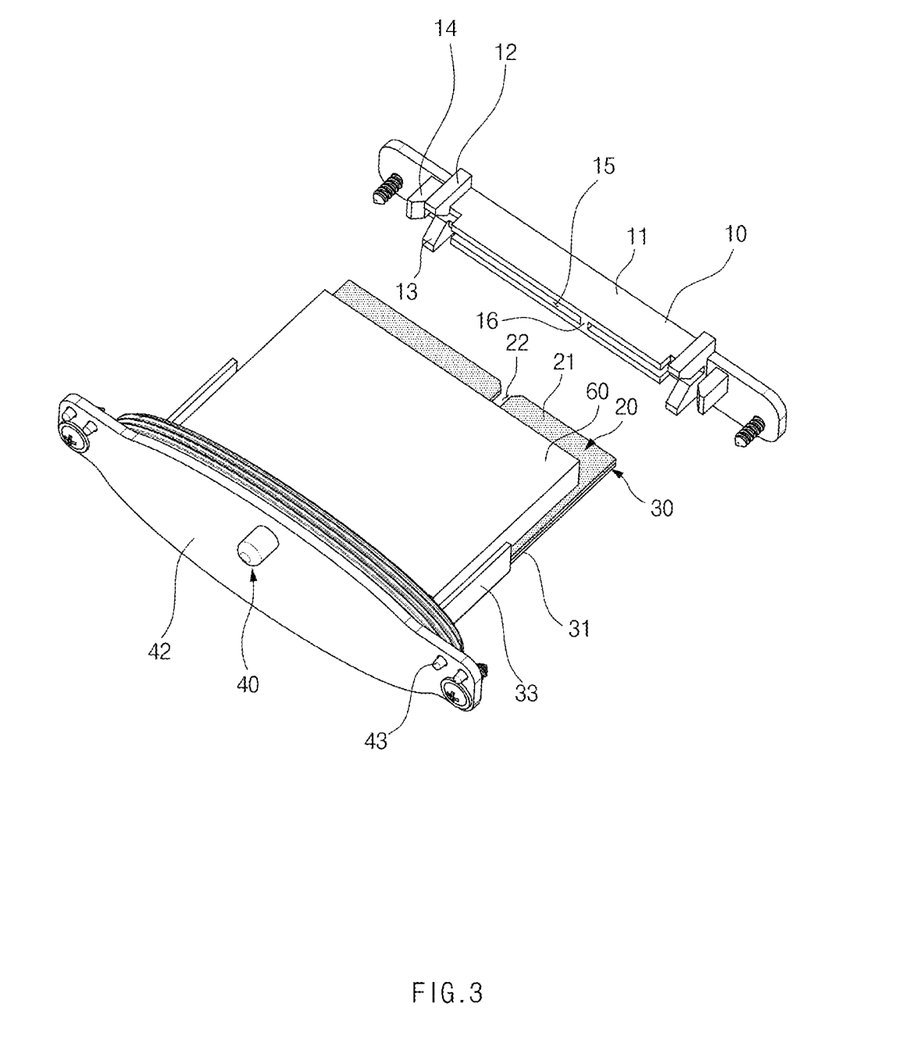
FIG. 3 is a perspective view illustrating a state, in which a board part and a seating part are separated from a connector part.

FIG. 3 is a perspective view illustrating a state, in which the board part 20 and the seating part 30 are separated from the connector part 10. Hereinafter, a misassembling preventing structure for preventing the board part 20 and the seating part 30 from being misassembled in the connector part 10 will be described below with reference to FIG. 3.

The connector part 10 may include a connector body 11, connector grooves 15, and a division member 16. The connector body 11 may be coupled to the vehicle.

The connector grooves 15 may be recessed at a distal end of the connector body 11 in the second direction D2, in the first direction D1. The connector grooves 15 may be configured such that a portion of the board part 20 is inserted thereinto.

The division member 16 may be disposed between the connector grooves 15 to divide the connector grooves 15. Because the division member 16 divides the connector grooves 15, a plurality of connector grooves 15 may be provided. The division member 16 may be biased in a leftward/rightward widthwise direction with reference to a center point of the connector grooves 15 in the leftward/rightward widthwise direction Meanwhile, the board part 20 may include a board member 21 and an insertion groove 22. The board member 21 may be electrically connected to the vehicle. The board part 20 may be a printed circuit board (PCB).

The insertion groove 22 may be recessed at a location of a distal end of the board member 21 in the first direction D1, in the second direction D2. The insertion groove 22 may be configured such that the division member 16 is inserted thereinto.

The division member 16 may be biased to one side and the insertion groove 22 is formed at a corresponding location, and thus the division member 16 and the insertion grooves 22 may function as a misassembling preventing structure. For example, when the division member 16 is biased rightwards, the division member 16 and the insertion groove 22 may be engaged with each other only when the insertion groove 22 also is biased rightwards. When the board member 21 is turned over and the insertion groove 22 is biased leftwards, the division member 16 and the insertion groove 22 are not engaged with each other, whereby misassembling may be prevented.

<Movement Guide Structure>

Hereinafter, a guide structure for guiding movement of the board part 20 and the seating part 30 when the board part 20 and the seating part 30 are moved toward the connector part 10 to be assembled in the connector part 10. For convenience of description, locations of the members will be described with reference to a state, in which the members are completely assembled.

Figure 4:
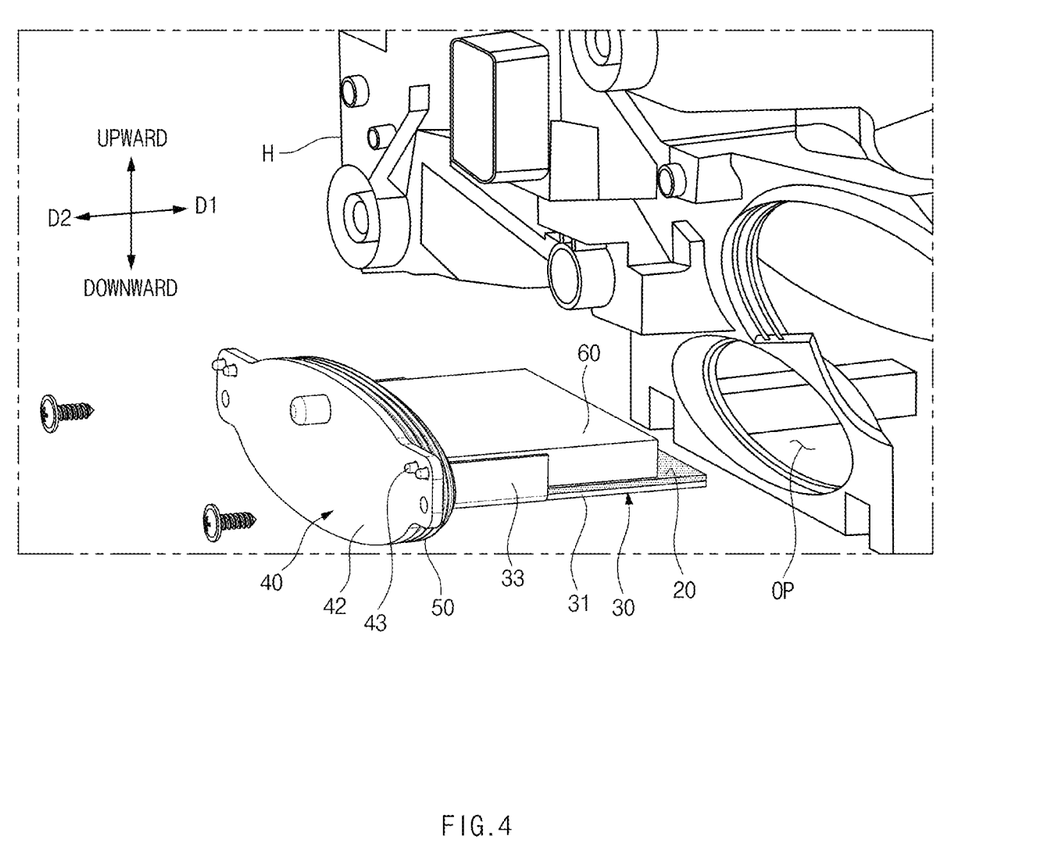
FIG. 4 is a view illustrating a case, in which a board part, a seating part, and a cover part of an LED driver module are located on an outside of a lamp housing according to an embodiment of the present disclosure.
Figure 5:
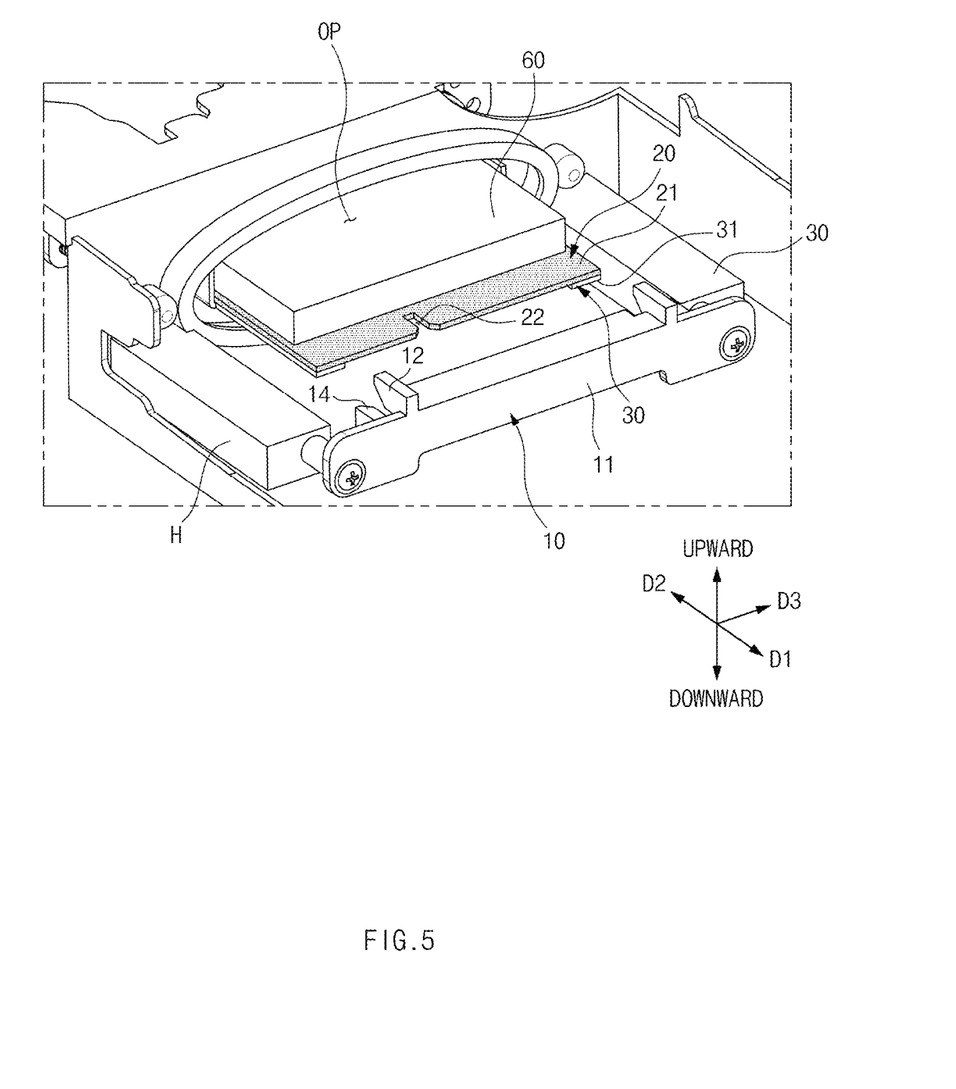
FIG. 5 is a view illustrating a case, in which portions of a board part and a seating part of an LED driver module are located on an inside of a lamp housing according to an embodiment of the present disclosure.
Figure 6:
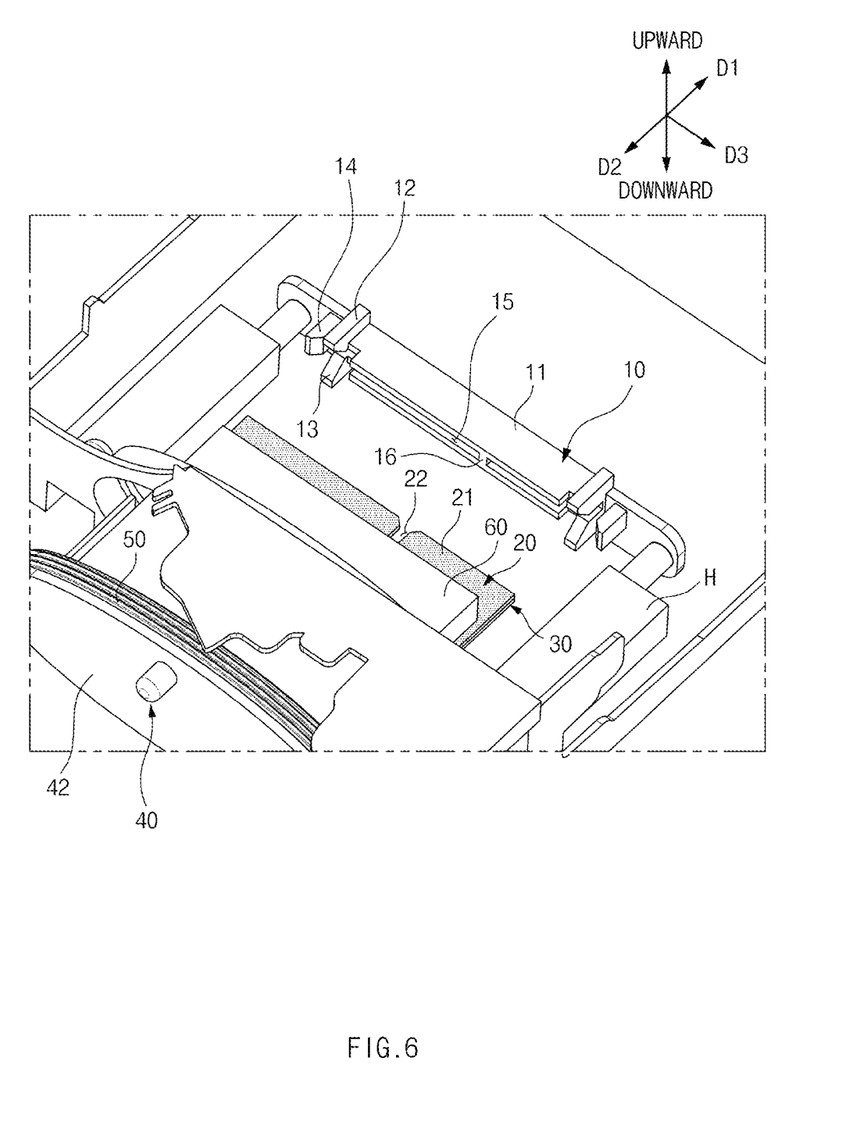
Figure 7:
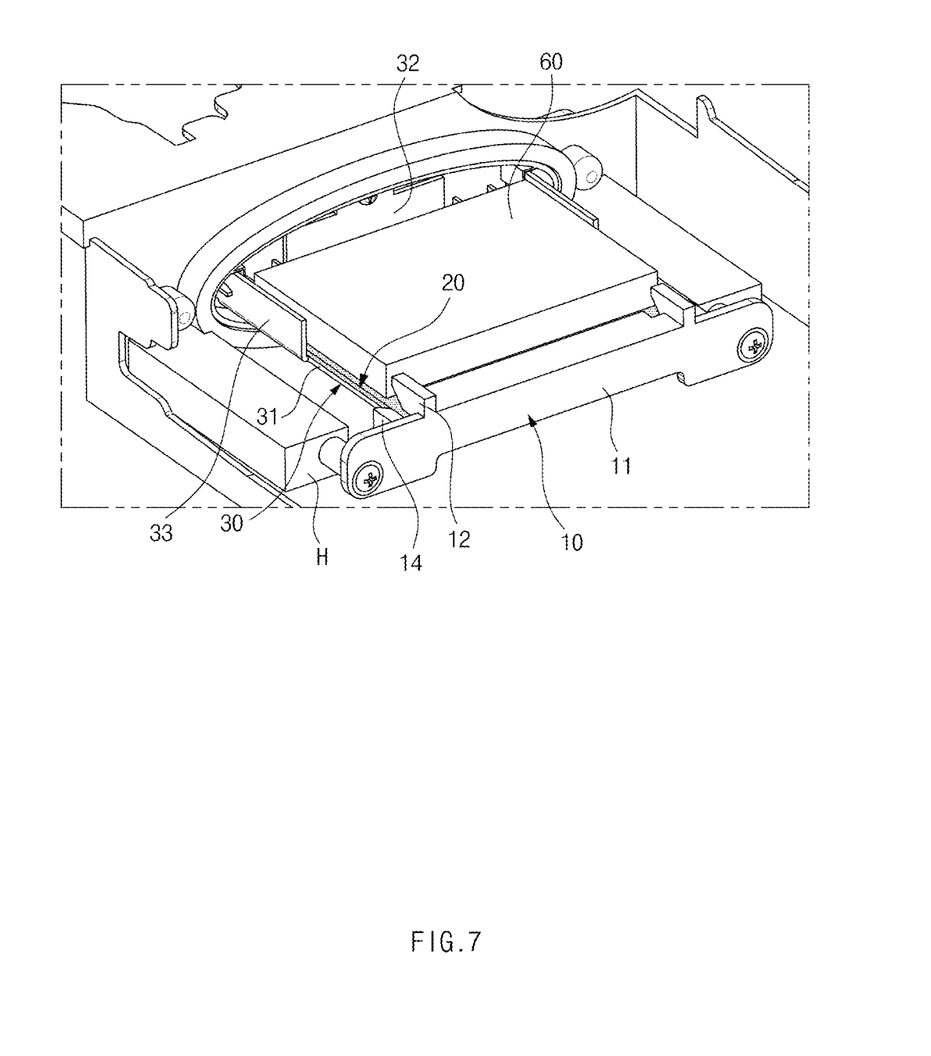
FIG. 7 is a view illustrating a state, in which a board part and a seating part contact a connector part.

Furthermore, FIGS. 4 to 7 will be referenced for understanding of the function of the guide structure. FIG. 4 is a view illustrating a case, in which the board part 20, the seating part 30, and the cover part 40 of the LED driver module are located on the outside of the lamp housing "H" according to the embodiment of the present disclosure. FIG. 5 is a view illustrating a case, in which portions of the board part 20 and the seating part 30 of the LED driver module are located on the inside of the lamp housing "H" according to the embodiment of the present disclosure. FIG. 6 is a view when FIG. 4 is viewed from another direction. FIG. 7 is a perspective view illustrating a state, in which the board part 20 and the seating part 30 contacts the connector part 10.

It may be understood that FIGS. 4 to 7 illustrate a process, in which the board part 20, the seating part 30, and the cover part 40 of the LED driver module are continuously assembled in the lamp housing "H" according to the embodiment of the present disclosure.

<Upper Guide Member 12>

The connector part 10 may include an upper guide member 12. The upper guide member 12 may be disposed on the board part 20. Furthermore, the upper guide member 12 may be coupled to the connector body 11.

The upper guide member 12 may include an upper guide surface. The upper guide surface may be inclined downwards as it goes in the first direction D1, and may guide the board part 20 toward a lower side. For example, when the board part 20 proceeds to a location that is higher than the connector groove 15, the board part 20 may contact the upper guide surface, and because the upper guide surface guides the board part 20 to a lower side, the board part 20 may be inserted into the connector groove 15.

<Lower Guide Member 13>

Furthermore, the connector part 10 may include a lower guide member 13. The lower guide member 13 may be disposed under the board part 20. The lower guide member 13 may be coupled to the connector body 11. The lower guide member 13 may be disposed in parallel in an upward/downward direction of the upper guide member 12.

The lower guide member 13 may include a lower guide surface. The lower guide surface may be inclined upwards as it goes in the first direction D1, and may guide the board part 20 toward an upper side. For example, when the board part 20 proceeds to a location that is lower than the connector groove 15, the board part 20 may contact the lower guide surface, and because the lower guide surface guides the board part 20 to an upper side, the board part 20 may be inserted into the connector groove 15.

<Outer Guide Member 14>

Furthermore, the connector part 10 may include an outer guide member 14. The outer guide member 14 may be disposed on a side of the board part 20 in an outward direction. Here, the outward direction may be a direction that faces an outside of the board part 20 with respect to the board part 20. As an example, the outward direction may be a leftward/rightward direction that is perpendicular to the first direction D1 and an upward/downward direction. That is, the outward direction may correspond to a third direction D3.

The outer guide member 14 may be coupled to the connector body 11. The outer guide member 14 may be disposed on a side of the upper guide member 12 and the lower guide member 13 in the outward direction.

The outer guide member 14 may include an outer guide surface. The outer guide surface may be inclined in an inward direction that is an opposite direction to the outward direction as it goes in the first direction D1, and may guide the board part 20 in the inward direction.

For example, when the board part 20 proceeds toward the outward direction of the connector groove 15, the board part 20 may contact the outer guide surface, and because the outer guide surface guides the board part 20 in the inward direction, the board part 20 may be inserted into the connector groove 15.

<Detailed Shape of Seating Part 30>

The seating part 30 may include a seating part body 31, a first protrusion member 32, and a second protrusion member 33. The board part 20 may be seated on the seating part body 31. The first protrusion member 32 may protrude upwards from a distal end of the seating part body 31 in the second direction D2. The second protrusion member 33 may protrude upwards from a distal end of the seating part body 31 in the third direction D3 that is perpendicular to the upward/downward direction and the first direction Dl. Due to a structure of the seating part 30, the board part 20 may be stably seated on the seating part body 31.

<Detailed Shape of Cover Part 40>

The cover part 40 may include a first cover member 41 and a second cover member 42. The first cover member 41 may be configured to be inserted into an opening OP formed in the lamp housing "H" of the vehicle and such that the seating part 30 is coupled thereto. The first cover member 41 may have a size corresponding to the opening OP. The first cover member 41 may prevent water from being introduced through the opening OP because it has the size corresponding to the opening OP. Accordingly, because the LED driver module according to the embodiment of the present disclosure does not require a separate case for water tightness, manufacturing costs may be reduced and production processes may be simplified.

The second cover member 42 may be coupled to a side of the first cover member 41 in the second direction D2. The second cover member 42 may have a size that is large enough to cover the first cover member 41 when viewed from the second direction D2. This may mean that the second cover member 42 may cover the opening OP. The second cover member 42 may be coupled to the lamp housing "H". FIG. 3 illustrates that the second cover member 42 is bolted to the lamp housing "H", but the present disclosure is not limited thereto and various modifications such as an adhesive or attachment using a magnet may be made.

The cover part 40 may further include at least one boss member 43. The boss member 43 may protrude outwards from the second cover member 42. The boss member 43 may function as a misassembling preventing structure when it is coupled to another LED later. For example, the LED is of type A, one hole may be formed on a left side such that the cover part 40 may be assembled only when one boss member 43 is provided on the left side. In this case, when the LED does not have one hole on the left side, it cannot be coupled to the cover part 40, whereby misassembling may be prevented.

<Sealing Part 50>

The LED driver module according to the embodiment of the present disclosure may further include the sealing part 50. The sealing part 50 may surround an outer surface of the first cover member 41, and may be disposed between the opening OP (FIG. 3) and the first cover member 41. The sealing part 50 may be formed of a rubber material, but the present disclosure is not limited thereto. Because the sealing part 50 is disposed between the opening OP and the first cover member 41, the water tightness between the opening OP and the first cover member 41 may be further secured.

<Shielding Part 50>

The LED driver module according to the embodiment of the present disclosure may further include the shielding part 60. The shielding part 60 may be disposed on the board part 20, and may electromagnetically shield the board part 20 from an outside. That is, the shielding part 60 may be a configuration for protecting the board part 20 from external electromagnetic waves.

<Electric Component Part 70>

Figure 8:
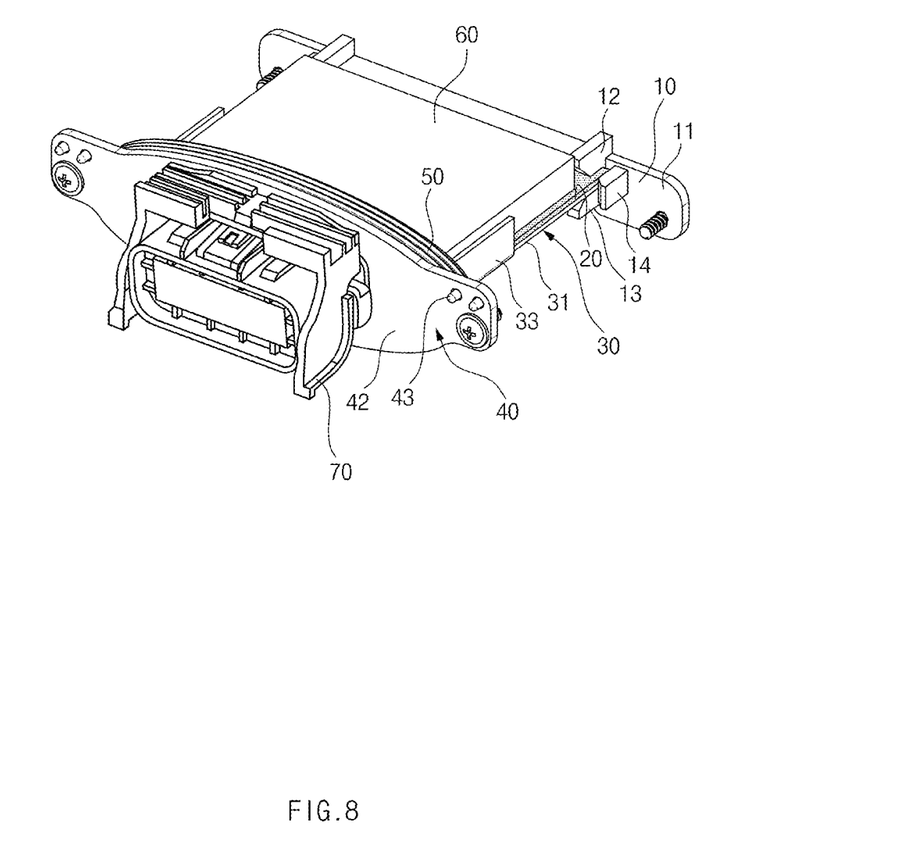
FIG. 8 is a perspective view illustrating an LED driver module further including an electric component part.

FIG. 8 is a perspective view illustrating an LED driver module further including an electric component part 70. As illustrated in FIG. 8, the LED driver module according to the embodiment of the present disclosure may further include the electric component part 70. The electric component part 70 may be coupled to a side of the second cover member 42 in the second direction D2, and may be electrically connected to the board part 20. When the electric component part 70 is further included, a need to separately add a main wire that is necessary for an electrical connection of the electric component part and the board part disappears as compared with a case, in which an electric component part is disposed in the lam housing, and thus manufacturing costs may be reduced, and an efficiency of utilizing spaces may be achieved.

<Vehicle Including LED Driver Module>

Hereinafter, a vehicle including an LED driver module according to an embodiment of the present disclosure will be described below. The above detailed description of the LED driver module may be applied to the vehicle according to the embodiment of the present disclosure in the same way.

The vehicle may include the lamp housing "H" (FIG. 3) and the LED driver module. The opening OP (FIG. 3) may be formed in the lamp housing "H". The LED driver module may be inserted into the opening OP.

As illustrated in FIGS. 4 to 7, the LED driver module may be inserted into an interior space of the lamp housing "H" through the opening OP. The LED driver module may include the connector part 10, the board part 20, the seating part 30, and the cover part 40. The connector part 10 may be coupled to an inside of the lamp housing "H". A distal end of the board part 20 in the first direction D1 may contact the connector part 10. The seating part 30 may be configured such that the board part 20 is seated thereon, and a distal end of the seating part 30 in the first direction D1 may contact the connector part 10. The cover part 40 may be coupled to a side of the seating part 30 in the second direction D2, and may cover the opening OP from an outside of the lamp housing "H" of the vehicle.

According to the present disclosure, because the LED driver module is disposed in the interior of the lamp housing, a separate case for water tightness may not be necessary.

Furthermore, according to the embodiment of the present disclosure, a process of sealing the case and a process of inspecting water tightness are not necessary, whereby the processes become simple and process costs may be reduced.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. An LED driver module coupled to a lamp housing of a vehicle, the lamp housing having a light-transmissive side and an opening opposite the light-transmissive side, the LED driver module comprising:
    a connector part coupled to an interior of the lamp housing of the vehicle and disposed adjacent to the light-transmissive side;
    a board part, of which a distal end in a first direction contacts the connector part, the first direction being a direction that faces an inside of the lamp housing from an outside thereof;
    a seating part, on which the board part is seated, and of which the distal end in the first direction contacts the connector part; and
    a cover part coupled to a side of the seating part in a second direction that is an opposite direction to the first direction and configured to close the opening of the lamp housing, and covering the board part and the seating part from the outside of the lamp housing.

2. The LED driver module of claim 1, wherein the connector part includes:
    a connector body coupled to the vehicle;

a plurality of connector grooves recessed from the distal end of the connector body in the second direction, in the first direction, and into which a portion of the board part is inserted; and a division member disposed between the plurality of connector grooves and configured to divide the plurality of connector grooves, wherein the board part includes:

a board member electrically connected to the vehicle; and an insertion groove recessed at a location of a distal end of the board member in the first direction, which corresponds to the division member, in the second direction, and into which the division member is inserted.

3. The LED driver module of claim 2, wherein the division member is biased in a leftward/rightward widthwise direction of at least one of the plurality of connector grooves with respect to a center point of the at least one of plurality of connector grooves in the leftward/rightward widthwise direction thereof.

4. The LED driver module of claim 1, wherein the connector part includes:

a connector body coupled to the vehicle; and an upper guide member disposed on the board part, and coupled to the connector body.

5. The LED driver module of claim 4, wherein the upper guide member includes:

an upper guide surface inclined downwards as it goes in the first direction, and configured to guide the board part toward a lower side.

6. The LED driver module of claim 4, wherein the connector part further includes:

a lower guide member disposed under the board part, and coupled to the connector body.

7. The LED driver module of claim 6, wherein the lower guide member includes:

a lower guide surface inclined upwards as it goes in the first direction, and configured to guide the board part toward an upper side.

8. The LED driver module of claim 6, wherein the upper guide member and the lower guide member are disposed in parallel in an upward/downward direction.

9. The LED driver module of claim 1, wherein the connector part includes:

a connector body coupled to the vehicle; and an outer guide member disposed in an outward direction that is a direction that faces an outside of the board part with respect to the board part, and coupled to the connector body.

10. The LED driver module of claim 9, wherein the outer guide member includes:

an outer guide surface inclined in an inward direction that is an opposite direction to the outward direction as it goes in the first direction, and configured to guide the board part toward the inward direction.

11. The LED driver module of claim 1, wherein the seating part includes:

a seating part body, on which the board part is seated;

a first protrusion member protruding upwards from a distal end of the seating part body in the second direction; and a second protrusion member protruding upwards from a distal end of the seating part in a third direction that is perpendicular to the upward/downward direction and the first direction.

12. The LED driver module of claim 1, wherein the cover part includes:

a first cover member inserted into an opening formed in the lamp housing of the vehicle, and to which the seating part is coupled; and a second cover member coupled to a side of the first cover member in the second direction, and having a size that is large enough to cover the first cover member when viewed from the second direction.

13. The LED driver module of claim 12, further comprising:

a sealing part surrounding an outer surface of the first cover member, and disposed between the opening and the first cover member.

14. The LED driver module of claim 12, wherein the cover part further includes:

at least one boss member protruding outwards from the second cover member.

15. The LED driver module of claim 12, further comprising:

an electric component part coupled to a side of the second cover member in the second direction, and electrically connected to the board part.

16. The LED driver module of claim 1, further comprising:

a shielding part disposed on the board part and configured to shield the board part.

17. A vehicle comprising:

a lamp housing having a light transmissive side and an opening opposite the light-transmissive side; and an LED driver module inserted into an interior space of the lamp housing through the opening, wherein the LED driver module includes:

a connector part coupled to an inside of the lamp housing vehicle and disposed adjacent to the light-transmissive side;

a board part, of which a distal end in a first direction contacts the connector part, the first direction being a direction that faces the inside of the lamp housing from an outside thereof;

a seating part, on which the board part is seated, and of which a distal end in the first direction contacts the connector part; and a cover part coupled to a side of the seating part in a second direction that is an opposite direction to the first direction and configured to close the opening of the lamp housing, and covering the opening from the outside of the lamp housing.

* * * * *